Aug. 21, 1928.  
J. E. KENERSON  
1,681,807  
PIPE CUTTER AND CUTTING WHEEL THEREFOR  
Filed May 11, 1926
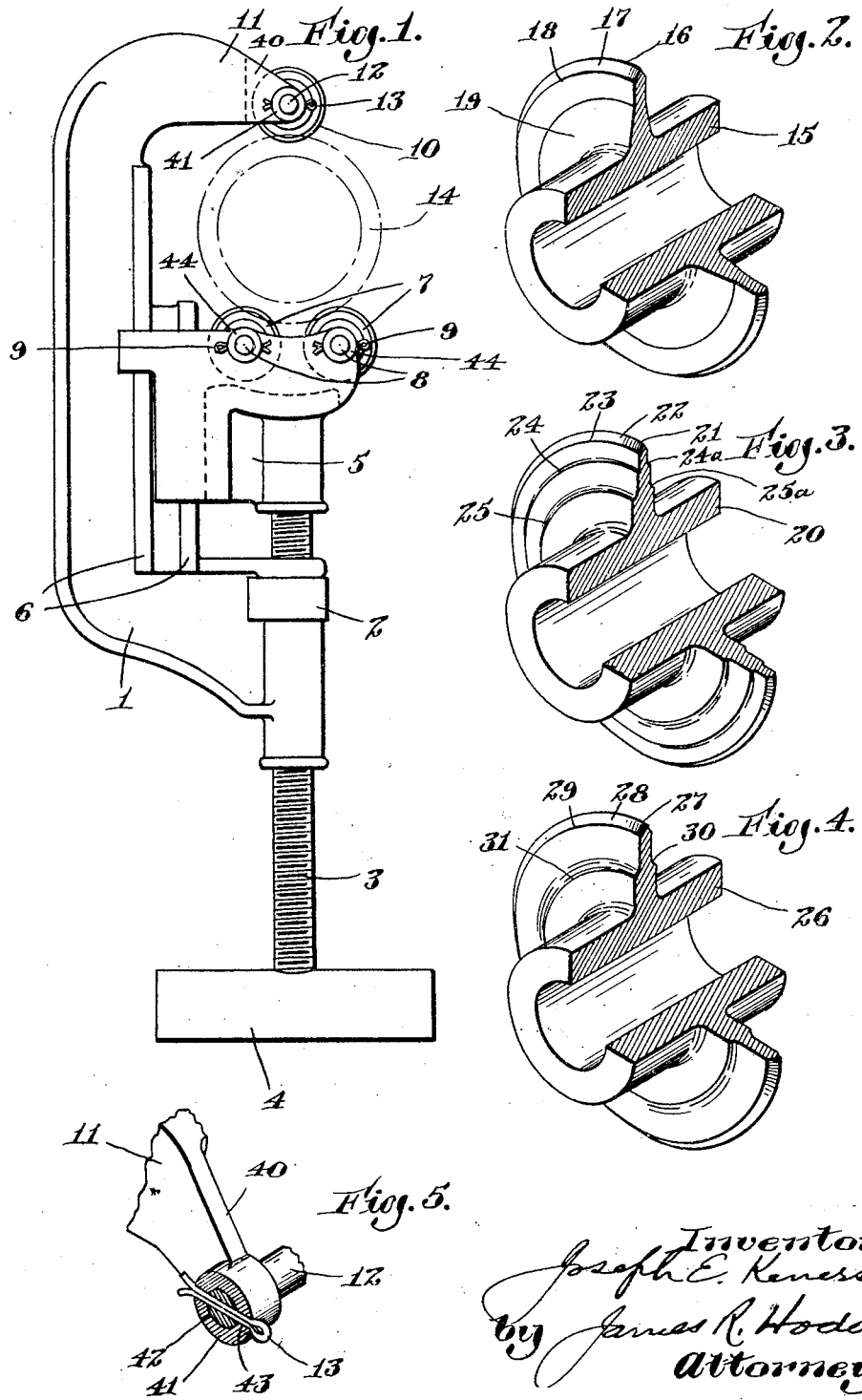
Inventor  
Joseph E. Kenerson  
by James R. Hodder  
Attorney Patented Aug. 21, 1928.

1,681,807

UNITED STATES PATENT OFFICE.

JOSEPH E. KENERSON, OF SAUGUS, MASSACHUSETTS, ASSIGNOR TO TRIMONT MANUFACTURING COMPANY, OF ROXBURY, MASSACHUSETTS, A CORPORATION OF MASSACHUSETTS.

PIPE CUTTER AND CUTTING WHEEL THEREFOR.

Application filed May 11, 1926. Serial No. 108,274.

My present invention relates to pipe cutters, and to cutting wheels for use therein.

Heretofore it has been necessary in so-called pipe cutting tools to have one or more cutting wheels, necessarily formed with a cutting edge, either a knife edge or a saw-like edge, and a roll, or a plurality of same, which are clamped about the pipe in a three point contact, and then adjusted together as the cutter is rotated about the pipe.

These prior pipe cutting tools, either when utilized as a one wheel cutter, or a three wheel cutter, have usually resulted in leaving a coarse burr or rough edge on the interior of the pipe, and furthermore have tended to bind or jam as the cutting wheels were forced further into the pipe during the rotating and cutting action. In such pipe cutting wheels it is desired to have as thin and sharp a cutting edge as possible, but a prior difficulty has been that such thin edges could not be made with sufficient strength, as well as thinness, to "stand up," particularly when a slight torsion, twist, or the like occurred during the pipe cutting action. This was particularly difficult in case of the three wheel pipe cutter as the three cutting wheels might not register exactly in the cutting groove of each other, and even in a one wheel cutter, where the cutting wheel cooperated with two bearing rolls, a considerable twist, strain, or torsion was apt to be exerted on the cutting wheel before the pipe was completely cut through, and hence the thin cutting portions of these wheels were readily broken.

In my present invention I have discovered a principle of construction whereby the cutting edge can be made extremely thin and yet reinforced and strengthened to a very great extent. Furthermore, I have discovered that I can make a pipe cutting wheel with an extremely thin bevel or cutting edge, and by providing one or more shoulders or subsequent bevelling and expanding surfaces, I secure the benefit of a wedging action as the pipe cutting progresses, which relieves any binding tension on the cutting edge, tends to put the sections of the pipe opposite the cutter under a tension which will result in a comparatively smooth finished interior cut, largely eliminating burrs, ridges, or other objectionable roughness, and to furthermore preserve the cutting wheels, make them last longer, and at the same time give a quicker and more efficient pipe cutting action. A further feature of my present invention is that the provision of these wedging or beveling shoulders also enables me to utilize this desirable feature as a strengthening structure for the cutting wheel, thereby enabling an extremely thin knife, knurled or other cutting edge on the periphery of the wheel, which is quickly strengthened by an adjacent wedging or beveled shoulder, or indeed, a plurality of such succeeding wedging shoulders.

In my present invention I believe that the provision, in a cutting wheel of this type, of means which will effect some wedging action, and preferably as such wedging surface or surfaces are at predetermined positions on the cutting wheel, relatively to the thickness of pipe to be cut, constitutes a distinct novelty in this art, and I wish to claim the same broadly.

I may form the combined wedging and strengthening shoulders either as successive beveled surfaces or as a single swelling thickness to the hub of the cutting wheel. I find that it is important, however, to have such shoulders or increasing thickness at substantial predetermined positions relatively with the diameter of the cutting wheel, and hence approximately proportional with the thickness of the pipe to be cut. An important feature of this predetermined positioning of the shoulders, of increasing thickness of the cutting wheel, is to enable the cutting edge to penetrate a substantial distance into the pipe before the wedging shoulder or increasing thickness becomes operative. Various modifications of my invention will readily occur to those skilled in the art, and, as herein shown, I have illustrated a thin edged cutting wheel with a single wedging shoulder, a plurality of such wedging shoulders arranged successively, and with a bevelled wedging and reinforcing structure independently of a pronounced shoulder form. It will also be appreciated that, while I have illustrated the pipe cutter as a three wheel cutter, the invention is equally applicable to a single wheel cutter.

Referring to the drawings illustrating the preferred embodiment of my invention, Fig. 1 is a side view of a pipe cutter equipped with my novel form of cutting wheels;

Fig. 2 is a perspective view, partly in cross section, of one form of cutter wheel, shown in enlarged view, having the thin cutting edge and running with parallel sides for a predetermined distance and then showing the increasing wedging and strengthening thickness;

Fig. 3 is a similar perspective view, partly in cross section, of my cutting wheel showing a plurality of successively wedging shoulders or bevels arranged substantially at predetermined positions with relatively parallel sides therebetween, and Fig. 4 is a corresponding view, partly in cross section, of a further modification illustrating a single wedging shoulder or bevel and strengthening thickness in the cutting wheel.

Fig. 5 being a detail of the wheel-carrying pin and method of securing same to the frame.

As shown in the drawings, the pipe cutter utilized in my present invention, comprises a frame 1, having a threaded nut 2 through which the handle screw 3 rotates to increase or decrease the cutting periphery of the cutting wheels. This screw 3 has a handle 4 for manipulation of the cutter and for rotating the screw 3. The handle screw 3 is swivelly connected to a roll block 5 which is slidably mounted on tracks 6 on the frame 1. In the block 5 are mounted a pair of cutting wheels, or if a one-wheel pipe cutter is desired, a pair of rolls 7, 7, mounted on pins 8, 8, which pins are secured against loss by cotter pins or the like 9, 9. A cutting wheel 10 is also secured to the arm 11 of the frame 1, the wheel 10 being mounted on a pin 12 secured by a cotter pin 13. This pin 12 is carried in yoke arms 40 having bosses, lugs or projections 41. The pin 12 is snugly fitted in recesses 42 in these bosses and a hole 43 bored or drilled through the pin and boss. This hole 43 can be drilled through the lug and pin after being assembled, or beforehand, as desired. The cotter or split pin 13 is then driven through the hole 43, such cotter pin being of the same diameter as the size of the hole, and results in a firm gripping and holding action of the pin in the boss, which bosses give increased bearing for wheel pins, roll pins and cotter pins preventing sideplay or looseness, and thereby greatly eliminating wear of rolls, frames and roll block pin holes, axles and cotter pins.

The pins 8 are likewise carried through bosses or projections 44 on the roll block 5, in the same manner as described for the pin 12.

In Fig. 1 the cutter is illustrated as equipped with three cutting wheels, 7, 7 and 10, adjusted and positioned for cutting a pipe 14, illustrated in dotted lines. As the cutting of the pipe progresses, the handle 4 is rotated, rotating the handle screw 3 through the nut 2 and moving the cutting wheels 7 on the block 5 into closer relation with the cutting wheel 10, thus preparing for a deeper cut on the pipe. It will be appreciated that this pipe cutter is swung around the pipe, in usual manner, to perform the pipe cutting action.

Figs. 2, 3, and 4 illustrate forms of cutting wheels which I have found desirable and advantageous of utilization in such a pipe cutter.

The feature of having the pins on which the cutting wheels are mounted, extend snugly through bosses formed on the cutter frame, and secured therein by close-fitting cotter pins through holes or apertures drilled through the bosses and pins, is a very important one, and capable of utilization with each of the forms of cutting wheels illustrated herein. In prior constructions, wherein the cotter pins extended merely through slots or the like in the cutter frame, this was disadvantageous for many reasons, resulting in breaking of the cotter pins, sideplay and looseness in the wheel-carrying pin, and frequently so weakening the cutter frame itself as to cause it to be broken in use. My present invention overcomes these difficulties, and greatly increases the strength of the cutter frame, as well as preventing looseness or sideplay of the pin, due to the snug tight fit of the component parts, and results in a highly efficient, satisfactory structure. I believe that this feature is novel with me and I have therefore included same in the claims in the present application.

Fig. 2 represents a novel cutting wheel comprising a hub 15, of a length sufficient to give a firm bearing on the pin on which it is mounted. This cutting wheel has the cutting edge 16, beveled as illustrated at 17, said bevel being relatively sharp to the shoulder 18. As the cutting action progresses, the cutting edge 16 advances further into the metal of the pipe being cut, and as above explained, there will be a jamming tendency on the part of the metal of the pipe against the parallel sides of the cutting blade. To overcome this difficulty, and to strengthen the cutting blade, as well as to afford a spreading action of the pipe outwardly from the kerf, I provide a beveled portion 19, which has a gradual taper from relatively near the cutting edge to the hub. Such a gradual taper or wedge will cause a gradual expanding action of the pipe being cut, will enable the cutter to be swung freely around the pipe, will prevent jamming of the cutting blade, will more or less prevent burrs or the like on the pipe being cut, and result in a more satisfactory operation.

In Fig. 3 I have illustrated another preferred from of cutting wheel, comprising a hub 20, cutting edge 21 and bevel 22 terminating at 23. In this particular form of cutting wheel I provide a plurality of wedging or sharply expanding portions or shoulders, 24 and 25, formed or defined by the fillets, radii or bevels 24ª and 25ª respectively, which will be found extremely desirable in certain types of work or material being operated upon, and which give the added advantages of progressive expanding and wedging actions as the pipe cutting progresses. This form is also of great value in that it provides a plurality of reinforcing or strengthening thicknesses of the wheel or blade, as clearly illustrated in Fig. 3. The sides of the cutting wheel, between the shoulders 24 and 25 respectively, are formed parallel, as are also the sides between the shoulder 25 and the hub of the cutting wheel.

Fig. 4 exemplifies a still further preferred form of my novel cutting wheel, having the hub 26, cutting edge 27 and bevel 28 terminating at 29, as shown. In this form I provide but a single expanding or wedging portion, but preferred to make same sharply expanding, as shown at the fillet 30, and terminating in the shoulder 31, rather than of a gradual tapering nature, as is the form illustrated in Fig. 2. This form has the advantage of providing the expanding action, causing less friction, as well as providing a strengthening and reinforcing portion throughout a large extent of the wheel. The form illustrated in Fig. 4 also has narrow parallel sides extending from the point 29 to the bevel 30, and from the shoulder 31 has parallel sides extending practically to the hub 26.

The cutting edges of the wheels illustrated herein may be also formed knurled or toothed, if desired, with equal feasability.

It will also be appreciated that the wedging or expanding shoulders illustrated may be formed at predetermined positions on the cutting wheel, relatively with the diameter thereof, and also relatively to the thickness of the class of pipe to be cut thereby.

I believe that my novel cutting wheels, as well as a pipe cutter provided therewith, are novel, and I therefore claim the same herein broadly.

While I have necessarily described my present invention somewhat in detail, it will be appreciated that I am not limited thereto, but may vary the size, shape and dimensions of parts within reasonably wide limits without departing from the spirit of the invention, so long as I adhere to the general theory of a cutting wheel having a relatively narrow cutting edge, with progressive reinforcing and expanding portions.

My invention is further described and defined in the form of claims as follows:

1. A cutting wheel of the kind described, having a single, sharp, circumferential cutting edge, with a plurality of reinforcing and expanding portions at predetermined spaced intervals relative to the diameter of the cutting wheel.

2. A pipe cutter of the kind described, having a plurality of cutter wheels, each of said cutter wheels having a single, sharp, circumferential cutting edge and a plurality of reinforcing and expanding portions at predetermined spaced intervals relative to the diameter of the cutting wheel.

3. A cutting wheel of the kind described, having a sharp, beveled circumferential cutting edge and a plurality of reinforcing and expanding portions at predetermined spaced intervals relative to the diameter of the cutting wheel, the sides of said wheel between said reinforcing and expanding portions being parallel, and said expanding portions being defined by fillets.

4. A pipe cutter of the kind described, having a plurality of cutter wheels, each of said cutting wheels having a sharp, beveled circumferential cutting edge and a plurality of reinforcing and expanding portions at predetermined spaced intervals relative to the diameter of the cutting wheel, the sides of said wheels between said reinforcing and expanding portions being parallel, and said expanding portions being defined by fillets.

5. A pipe cutter of the kind described, comprising a frame, a plurality of cutter wheels, each of said cutter wheels having a sharp, circumferential cutting edge and a plurality of reinforcing and expanding portions at predetermined spaced intervals relative to the diameter of the cutter wheels, bosses on the frame of said cutter pins passing through said bosses, said wheels being mounted on said pins, and means extending through said bosses and said pins to secure said pins against movement.

6. A pipe cutter of the kind described, comprising a frame, a plurality of cutting wheels, each of said cutting wheels having a sharp, beveled circumferential cutting edge and a plurality of reinforcing and expanding portions at predetermined spaced intervals relative to the diameter of the cutting wheel, the sides of said wheels between said reinforcing and expanding portions being parallel and said expanding portions being defined by fillets, bosses on the frame of said cutter pins passing through said bosses, said wheels being mounted on said pins, and means extending through said bosses and said pins to secure said pins against movement.

7. A pipe cutter of the kind described comprising a frame, a cutting wheel with a sharp, beveled circumferential cutting edge and narrow parallel sides, with a reinforcing and expanding portion, bosses on the frame of said cutter, a pin passing through said bosses, said wheel being mounted on said pin, and means extending through said bosses and said pin to secure said pin against movement.

8. A pipe cutter of the kind described, comprising a frame, a cutting wheel with a sharp, beveled circumferential cutting edge and a plurality of reinforcing and expanding portions, the sides of said wheel between said reinforcing and expanding portions being parallel and said expanding portions being defined by fillets, bosses on the frame of said pipe cutter, a pin passing through said bosses, said wheel being mounted on said pin, and means extending through said bosses and said pin to secure said pin against movement.

In testimony whereof, I have signed my name to this specification.

JOSEPH E. KENERSON.